(12) United States Patent
Kato et al.

(10) Patent No.: US 9,416,226 B2
(45) Date of Patent: Aug. 16, 2016

(54) POLYALKYLENE OXIDE PARTICLES AND PRODUCTION METHOD FOR THE SAME

(75) Inventors: Makoto Kato, Tokyo (JP); Toru Ido, Himeji (JP); Shizuka Hachiken, Himeji (JP)

(73) Assignee: Sumitomo Seika Chemicals Co., Ltd., Hyogo (JP)

( * ) Notice: Subject to any disclaimer, the term of this patent is extended or adjusted under 35 U.S.C. 154(b) by 94 days.

(21) Appl. No.: 14/123,340

(22) PCT Filed: May 21, 2012

(86) PCT No.: PCT/JP2012/062959
§ 371 (c)(1),
(2), (4) Date: Dec. 2, 2013

(87) PCT Pub. No.: WO2012/165199
PCT Pub. Date: Dec. 6, 2012

(65) Prior Publication Data
US 2014/0120349 A1  May 1, 2014

(30) Foreign Application Priority Data

Jun. 3, 2011  (JP) ................ P2011-125631

(51) Int. Cl.
| | | |
|---|---|---|
| *C08G 65/12* | (2006.01) | |
| *C08G 65/08* | (2006.01) | |
| *C08G 65/10* | (2006.01) | |
| *C08G 65/26* | (2006.01) | |

(52) U.S. Cl.
CPC ............ *C08G 65/08* (2013.01); *C08G 65/10* (2013.01); *C08G 65/12* (2013.01); *C08G 65/266* (2013.01); *C08G 65/269* (2013.01); *Y10T 428/2982* (2015.01)

(58) Field of Classification Search
None
See application file for complete search history.

(56) References Cited

U.S. PATENT DOCUMENTS

| | | | | |
|---|---|---|---|---|
| 3,321,412 | A | * 5/1967 | Naro .............. | C08G 65/2657 502/73 |
| 4,667,013 | A | * 5/1987 | Reichle ........................ | 528/414 |
| 5,210,322 | A | * 5/1993 | King et al. .................... | 568/579 |
| 5,288,841 | A | * 2/1994 | Bellis et al. ................... | 528/275 |
| 5,900,384 | A | 5/1999 | Soltani-Ahmadi et al. | |
| 6,039,784 | A | 3/2000 | Luk | |
| 6,348,565 | B1 | * 2/2002 | Wehmeyer ............... | B01J 27/26 502/102 |
| 6,548,714 | B1 | * 4/2003 | Grosch et al. ................. | 568/679 |
| 7,169,956 | B2 | 1/2007 | Suzuki | |

FOREIGN PATENT DOCUMENTS

| | | |
|---|---|---|
| CN | 1480469 | 3/2004 |
| CN | 1524103 | 8/2004 |
| CN | 1611523 | 5/2005 |
| CN | 1795050 | 6/2006 |
| CN | 1802400 | 7/2006 |
| CN | 101506268 | 8/2009 |
| EP | 0 239 973 | 10/1987 |
| EP | 0 990 657 | 4/2000 |
| JP | 53-027319 | 3/1978 |
| JP | 62-232433 | 10/1987 |
| JP | 5-017566 | 1/1993 |
| JP | 6-248068 | 9/1994 |
| JP | 2002-105195 | 4/2002 |
| JP | 2002-105196 | 4/2002 |
| JP | 2002-121276 | 4/2002 |
| JP | 2007-270068 | 10/2007 |
| TW | 200504082 | 2/2005 |
| WO | 99/51610 | 10/1999 |
| WO | 2006/100219 | 9/2006 |

OTHER PUBLICATIONS

Machine translation JP 2002-105195.*
Database WPI, Week 200132 Thomson Scientific, London, GB; AN 2001-303414, XP002738444—3 pages.
Extended European Search Report issued in European Patent Application No. 12793323.2 on Apr. 28, 2015, 7 pages.
Pingjun, et al. "Influences of Catalyst Component and Preparation Condition on Average Particle Size of PE Resin", QILU Petrochemical Technology, vol. 36, No. 4, pp. 289-290, Mar. 24, 2009.
Office Action issued in Chinese Application No. 201280026600.4 on Feb. 17, 2015.
Office Action issued in Chinese Application No. 201280026616.5 on Feb. 17, 2015.
Office Action issued in Taiwanese Application No. 101119041, Jun. 29, 2015, 4 pages.

* cited by examiner

*Primary Examiner* — Alexandre Ferre
(74) *Attorney, Agent, or Firm* — Hamre, Schumann, Mueller & Larson, P.C.

(57) ABSTRACT

The present invention relates to a production method of polyalkylene oxide particles including a step of forming the polyalkylene oxide particles by polymerization of an alkylene oxide in a polymerization solution containing a polymerization solvent and a catalyst dispersed in the polymerization solvent. The average particle diameter of the catalyst is more than 25 μm.

4 Claims, No Drawings

POLYALKYLENE OXIDE PARTICLES AND PRODUCTION METHOD FOR THE SAME

TECHNICAL FIELD

The present invention relates to polyalkylene oxide particles and a production method for the same.

BACKGROUND ART

A polyalkylene oxide is water-soluble and thermoplastic, therefore, the polyalkylene oxide is used for uses such as a viscous agent for papermaking, a ceramic binder, a polymerization stability assistant and a material for a pharmaceutical preparation. When the polyalkylene oxide is used as a thickener such as a viscous agent for papermaking and the like, generally, the polyalkylene oxide having a high molecular weight is preferable from the viewpoint of a viscosity control. As a production method of the polyalkylene oxide having a high molecular weight, a method using a catalyst obtained by the reaction of an organozinc compound with an aliphatic polyhydric alcohol and a monohydric alcohol has been reported (refer to patent literature 1).

CITATION LIST

Patent Literature

[Patent Literature 1] Japanese Unexamined Patent Application Publication No. H5-17566

SUMMARY OF INVENTION

Technical Problem

However, it was found that the polyalkylene oxide obtained by the production method disclosed in patent literature 1 tends to be difficult to be dispersed into or dissolved in a medium such as water, when it is used as a mucilaginous agent for papermaking for example.

Accordingly, an object of the present invention is to provide polyalkylene oxide particles having an excellent dispersibility in a medium such as water and a production method thereof.

Solution to Problem

The present invention relates to a production method of polyalkylene oxide particles comprising forming polyalkylene oxide particles by polymerization of an alkylene oxide in a polymerization solution containing a polymerization solvent and a catalyst dispersed in the polymerization solvent (polymerization step). The average particle diameter of the catalyst is more than 25 μm.

The polyalkylene oxide particles obtained by the above-described production method have an excellent dispersibility in a medium such as water.

It is preferable that the catalyst is an organozinc catalyst. Furthermore, it is preferable that the organozinc catalyst is a particulate reaction product obtainable by a method including: reacting an organozinc compound with an aliphatic polyhydric alcohol and a monohydric alcohol thereby forming a particulate reaction product (reaction step).

When a polymerization solution contains such an organozinc catalyst, the molecular weight of a polyalkylene oxide can be controlled to be higher.

It is preferable that the polymerization solution contains 0.00005 mol or more of the catalyst with respect to 1 mol of an alkylene oxide. When the used amount of the catalyst is in the above-described range, the decrease in a polymerization reaction rate can be suppressed and polymerization time can be controlled to be shorter.

The present invention also relates to polyalkylene oxide particles obtainable by the above-described production method. The proportion of particles having a particle diameter less than 150 μm in the polyalkylene oxide particles according to the present invention is less than 40% by mass.

Advantageous Effects of Invention

The polyalkylene oxide particles obtainable by the above-described production method have an excellent dispersibility in a medium such as water. Furthermore, the polyalkylene oxide particles are excellent in solubility in a medium such as water since the polyalkylene oxide particles are less likely to aggregate.

DESCRIPTION OF EMBODIMENTS

Hereinbelow, the embodiments of the present invention will be described. However, the present invention is not limited to the following embodiments.

The production method of the polyalkylene oxide particles according to the embodiments comprising: forming polyalkylene oxide particles by polymerization of an alkylene oxide in a polymerization solution containing a polymerization solvent and a catalyst dispersed in the polymerization solvent.

The alkylene oxide may be at least one kind selected from a group consisting of ethylene oxide, propylene oxide, butylene oxide, cyclohexene oxide, styrene oxide and epichlorohydrin, for example. Among these alkylene oxides, ethylene oxide or propylene oxide are preferably used since the solubility to water of the obtained polyalkylene oxide is high. These alkylene oxides may be used alone respectively, or two or more kinds may be used in combination.

The polymerization solvent may be at least one kind of a hydrocarbon solvent of selected from a group consisting of n-pentane, n-hexane, n-heptane and cyclohexane, for example. Among these polymerization solvents, n-hexane or n-pentane is preferably used from the viewpoint that these solvents have easy industrial availability, the boiling points thereof are lower than the melting point of the obtained polyalkylene oxide and after the polymerization reaction, these solvents can be easily removed. These polymerization solvents may be used alone respectively, or two or more kinds may be used in combination.

The used amount of the polymerization solvent is preferably 200 parts by mass to 10000 parts by mass and more preferably 400 parts by mass to 600 parts by mass with respect to 100 parts by mass of an alkylene oxide from the viewpoint of the easy removal of the heat of polymerization and the easy control of a polymerization reaction.

Usually, the catalyst in the embodiment is a particulate. The average particle diameter of the catalyst is more than 25 μm, preferably 30 μm to 50 μm and more preferably 35 μm to 45 μm. When the average particle diameter of the catalyst is 25 μm or less, there is tendency that the particle diameter of the obtained polyalkylene oxide particles is small, swelling of the particulate in a medium such as water is fast and a poor dispersion in the medium occurs. The value of the average particle diameter of the catalyst is measured by a laser diffraction method to be described below.

It is preferable that the catalyst is an organozinc catalyst from the viewpoint of obtaining the polyalkylene oxide having a high molecular weight. It is preferable that the organozinc catalyst as a catalyst is a particulate reaction product of obtainable by a method including: reacting an organozinc compound with an aliphatic polyhydric alcohol and a monohydric alcohol, thereby forming a particulate reaction product.

The organozinc compound to be used for obtaining the organozinc catalyst is a compound represented by a general formula, $ZnR_2$ (R represents a monovalent organic group), for example. Examples of R include an alkyl group having 1 to 6 carbon atoms, a phenyl group and a cycloalkyl group having 4 to 6 carbon atoms. Specific examples of the organozinc compound include dialkyl zincs such as dimethyl zinc, diethyl zinc, di-n-propyl zinc and di-n-butyl zinc, diphenyl zinc, dicyclobutyl zinc and the like. These organozinc compounds may be used alone respectively, or two or more kinds may be used in combination.

The aliphatic polyhydric alcohol to be used for obtaining a particulate reaction product described above as an organozinc catalyst is an aliphatic alcohol having 2 or more hydroxyl groups and 2 or more carbon atoms. The aliphatic polyhydric alcohol may be at least one kind selected from a group consisting of ethylene glycol, propylene glycol, 1,2-butanediol, 1,3-butanediol, 1,4-butanediol, 2,3-butanediol, 1,5-pentanediol, 2,3,4-pentanetriol, glycerine and pentaerythritol, for example. The aliphatic polyhydric alcohol is preferably an aliphatic polyhydric alcohol having 4 carbon atoms from the viewpoint of obtaining the polyalkylene oxide having a high molecular weight. Examples of the aliphatic polyhydric alcohol having 4 carbon atoms include 1,3-butanediol and 1,4-butanediol. These aliphatic polyhydric alcohols may be used alone respectively, or two or more kinds may be used in combination.

The used amount of the aliphatic polyhydric alcohol is preferably 0.1 mol to 1.1 mol and more preferably 0.3 mol to 0.9 mol with respect to 1 mol of the organozinc compound. When the used amount of the aliphatic polyhydric alcohol is less than 0.1 mol with respect to 1 mol of the organozinc compound, there is a possibility that it takes long time to react due to extreme decrease of the polymerization reaction rate, which is economically disadvantageous. When the used amount of the aliphatic polyhydric alcohol is more than 1.1 mol with respect to 1 mol of the organozinc compound, there is a possibility that the obtained polyalkylene oxide particles cohere to agglomerate.

The monohydric alcohol to be used for obtaining a particulate reaction product described above as the organozinc catalyst is an alcohol which has one hydroxyl group and does not have an active hydrogen other than the active hydrogen of the hydroxyl group. The monohydric alcohol may be at least one kind selected from a group consisting of primary alcohols such as methanol, ethanol, 1-propanol and 1-butanol; secondary alcohols such as 2-propanol and 2-butanol; and tertiary alcohols such as t-butanol, for example. The monohydric alcohol is preferably a monohydric alcohol having 1 to 6 carbon atoms among them from the viewpoint of obtaining the polyalkylene oxide having a high molecular weight. Examples of the monohydric alcohol having 1 to 6 carbon atoms include ethanol, propanol and butanol. These monohydric alcohols may be used alone respectively, or two or more kinds may be used in combination.

The used amount of the monohydric alcohol is preferably 1 mol or more, more preferably 2 mol to 15 mol and further more preferably 4 mol to 12 mol with respect to 1 mol of the organozinc compound. When the used amount of the monohydric alcohol is less than 1 mol with respect to 1 mol of the organozinc compound, there is a tendency that the polymerization reaction of an alkylene oxide is not smoothly preceded. When the used amount of the monohydric alcohol is more than 15 mol with respect to 1 mol of the organozinc compound, there is a tendency that the time required for removal is increased due to increase of the amount to be removed when an unreacted alcohol is removed as described below.

Molar ratio of a monohydric alcohol with respect to an aliphatic polyhydric alcohol is calculated as "moles of a monohydric alcohol/moles of an aliphatic polyhydric alcohol". The molar ratio is preferably 2 or more and more preferably 4 to 50. When the molar ratio is less than 2, there is a tendency that the polymerization reaction of an alkylene oxide is not smoothly preceded. When the molar ratio is more than 50, there is a tendency that the time required for removal is increased when an unreacted alcohol is removed as described below. As the molar ratio is increased, there is a tendency that the average particle diameter of the obtained catalyst is increased.

The method for reacting an organozinc compound with an aliphatic polyhydric alcohol and a monohydric alcohol is not particularly limited. For example, the reaction can be carried out by (1) a method in which after an organozinc compound is reacted with a monohydric alcohol, the product is reacted with an aliphatic polyhydric alcohol, (2) a method in which after an organozinc compound is reacted with an aliphatic polyhydric alcohol, the product is reacted with a monohydric alcohol and (3) a method in which an organozinc compound is reacted with an aliphatic polyhydric alcohol and a monohydric alcohol at the same time. Among these methods, (3) a method in which an organozinc compound is reacted with an aliphatic polyhydric alcohol and a monohydric alcohol at the same time is particularly preferable from the viewpoints of easy handleability.

Usually, the reaction of an organozinc compound with an aliphatic polyhydric alcohol and a monohydric alcohol is carried out in a reaction solution containing a solvent for preparing a catalyst under an inert gas atmosphere from the viewpoint of carrying out a reaction smoothly.

As a solvent for preparing a catalyst, hydrocarbon solvents such as n-pentane, n-hexane, n-heptane and cyclohexane are exemplified. Among these solvents for preparing a catalyst, n-hexane or n-heptane are preferably used from the viewpoint that these solvents have easy industrial availability, the quality thereof is stable and the prices thereof are low. These solvents for preparing a catalyst may be used alone respectively, or two or more kinds may be used in combination.

The inert gas is not particularly limited as long as it is a gas that unlikely inactivates the obtained organozinc catalyst. For example, nitrogen gas, argon gas and helium gas are exemplified.

When an organozinc compound is reacted with an aliphatic polyhydric alcohol and a monohydric alcohol, preferably, an aliphatic polyhydric alcohol and a monohydric alcohol are supplied as a mixture thereof or separately to a reaction solution containing an organozinc compound and the above-described solvent. Supply (addition) rate into the reaction system (reaction solution) of an aliphatic polyhydric alcohol or a monohydric alcohol is preferably 10 g/min or less and more preferably 2 g/min or less. When the supply rate is 10 g/min or less, there is a tendency that the particle size distribution of the obtained catalyst can be controlled to be narrower. In addition, the temperature of the reaction system (reaction solution) at the time of supplying an aliphatic polyhydric alcohol or a monohydric alcohol into the reaction system is preferably 0° C. to 60° C.

After supplying an aliphatic polyhydric alcohol and a monohydric alcohol into the reaction system, the temperature of reaction system may be changed and may be adjusted to other temperatures (reaction temperature) in order to proceed the reaction of an alcohol with an organozinc compound. The reaction temperature is generally 0° C. to 200° C. and preferably 20° C. to 200° C. The reaction time, for example, is 0.5 hours to 10 hours.

The reaction solution containing an organozinc compound, an aliphatic polyhydric alcohol and a monohydric alcohol is preferably stirred. Stirring can be carried out by a well-known method. The stirring rate is preferably low. When the stirring rate is low, there is a tendency that the average particle diameter of the obtained catalyst is increased.

The catalyst is obtained in a state of a dispersion dispersed in a solvent for preparing the catalyst, an unreacted aliphatic polyhydric alcohol and a monohydric alcohol and the like. An unreacted alcohol is preferably removed from the dispersion from the viewpoint of carrying out a polymerization reaction smoothly. The catalyst is preferably supplied to a polymerization reaction in a state of a dispersion containing substantially only a solvent for preparing the catalyst as a dispersion medium from the viewpoint of suppressing inactivation of the catalyst.

The polymerization solution preferably contains 0.00005 mol or more of a catalyst and more preferably 0.0001 mol to 0.0006 mol with respect to 1 mol of an alkylene oxide. When the used amount of the catalyst is less than 0.00005 mol with respect to 1 mol of an alkylene oxide, there is a possibility that it takes long time to polymerize due to extreme decrease of the polymerization reaction rate.

The method for polymerizing an alkylene oxide in a polymerization solution containing a polymerization solvent and a catalyst dispersed in the polymerization solvent is not particularly limited. For example, the polymerization solvent and the catalyst are added into a polymerization reaction vessel and an alkylene oxide is further added to prepare the polymerization solution, and the alkylene oxide can be polymerized with stirring the polymerization solution under an inert gas atmosphere. Usually the polymerization reaction is carried out with stirring the polymerization solution from the viewpoint of increasing polymerization reaction efficiency and suppressing agglomeration of polyalkylene oxide particles.

The inert gas to be used in polymerization reaction is not particularly limited as long as it is a gas that unlikely inactivates the catalyst. For example, nitrogen gas, argon gas and helium gas are exemplified.

The polymerization temperature of the polymerization reaction (temperature of a polymerization solution) is generally 5° C. to 100° C. and preferably 20° C. to 50° C. The reaction time of the polymerization reaction is generally 0.5 hours to 10 hours.

After the polymerization reaction is completed, for example, by drying the product collected by filtration, the powder of polyalkylene oxide particles is obtained.

Thus, the obtained polyalkylene oxide particles usually are made up of a plurality of particles (primary particles) having a different particle diameter. In particular, the polyalkylene oxide particles according to the embodiment characteristically have the low content of particles having a small particle diameter. In the polyalkylene oxide particles, the proportion of particles having a particle diameter of less than 150 μm is preferably less than 40% by mass, more preferably less than 30% by mass, further preferably less than 20% by mass and particularly preferably less than 10% by mass from the viewpoint of dispersibility and solubility in a medium such as water. The lower limit of the proportion of particles having a particle diameter less than 150 μm is not particularly limited and may be 0% by mass. The values of the mass percentage of particles having a particle diameter less than 150 μm in the polyalkylene oxide particles (particle size distribution) can be measured by a mesh passing type classification method described below. There are many cases in which the above-described particle diameter corresponds to primary particle diameter of the polyalkylene oxide particles.

In the particle size distribution of the obtained polyalkylene oxide particles, the proportion of small particles is decreased by using a catalyst having a specific average particle diameter in the production process of the polyalkylene oxide particles of the present embodiment. As a result, the dispersibility and the solubility of the polyalkylene oxide particles in a medium such as water are improved.

EXAMPLES

Hereinafter, the present invention will be described in detail using Preparation Examples, Examples and Comparative Examples. However, the present invention is not limited to the following Examples.

[Evaluation Method]

The catalyst obtained in Preparation Examples and the polyalkylene oxide particles obtained in Examples were evaluated according to the following method.

(1) Average Particle Diameter of Catalyst

The average particle diameter of the catalyst is measured by a laser diffraction method to be described below.

A catalyst slurry was prepared using hexane as a carrier. The catalyst slurry was circulated in a laser diffraction type particle size distribution measuring apparatus (manufactured by Shimadzu Corporation, model: SALD-7100) and the average particle diameter of the catalyst was measured.

(2) Particle Size Distribution and Mass Average Particle Diameter of Polyalkylene Oxide Particles The particle size distribution and the mass average particle diameter of polyalkylene oxide particles were measured and calculated by a mesh passing type classification method described below.

100 g of polyalkylene oxide particles and 2 g of amorphous silica (manufactured by Tokuyama Corporation, Tokusil NP) as a lubricant were mixed.

As a JIS Z 8801-1 standard sieve, sieves having 500 μm, 300 μm, 250 μm, 180 μm, 150 μm, 106 μm and 75 μm of sieve opening were stacked on a saucer in this order from the top.

The mixture of the polyalkylene oxide particles and the amorphous silica was put into a sieve having 500 μm of sieve opening placed at the top. The mixture was classified by shaking the sieve for 20 minutes using a Ro-tap type shaker.

After the classification was completed, the mass of polyalkylene oxide particles remained on each sieve was measured and the mass percentage with respect to the total amount of each mass was calculated. The mass percentage was integrated in order from the sieve having a large opening size to the sieve having a small opening size, and the relationship between the opening size of the sieve and the integrated value of the mass percentage (integrated mass percentage) of the polyalkylene oxide particles remained on the sieve was plotted on a logarithmic probability paper. The plot on the paper was connected by a straight line and the value of the opening size of the sieve when the integrated mass percentage is 50% by mass was regarded as the mass average particle diameter of the polyalkylene oxide particles.

Furthermore, the total value of the mass percentage of the polyalkylene oxide particles remained on the sieve having 106 μm of sieve opening, the sieve having 75 μm of sieve opening and the saucer was calculated as the mass percentage of particles having a particle diameter less than 150 μm.

(3) Dispersibility of Polyalkylene Oxide Particles in Water 500 g of deionized water was put into a beaker of 1000 mL and the temperature of the deionized water was adjusted to 25° C. 2.5 g of polyalkylene oxide particles was put thereto at one time with stirring the deionized water in the beaker at a rotation speed of 250 rpm using a stirrer equipped with a 2 blade upright type paddle (blade diameter: 80 mm). After stirring for 10 seconds, the stirring was stopped. Then, the dispersion state of polyalkylene oxide particles in the beaker was visually observed. The dispersibility was evaluated according to the following criteria. In the following criteria, "big aggregates" means coarse aggregates enough to be visually confirmed.

A: the number of big aggregates is 0 (none)
B: the number of big aggregates is 1 to 2
C: the number of big aggregates is 3 to 4
D: the number of big aggregates is 5 or more Preparation Example 1

Catalyst A

A flask having an inner diameter of 80 mm and a volume of 500 mL equipped with a reflux condenser, a dropping funnel, a nitrogen gas inlet tube and an impeller having four paddle blades (inclination of) 45° of a blade diameter of 53 mm as a stirrer was prepared.

After replacing the inside of the flask with a nitrogen gas, 56.3 g of n-hexane (manufactured by Sumitomo Chemical Co., Ltd., high purity for industrial use) and 9.9 g of an aliphatic hydrocarbon (manufactured by Nippon Oil Co., Ltd., trade name: No. 0 solvent) having a high boiling point were added into the flask, and 9.9 g (80 mmol) of diethyl zinc (manufactured by Nippon Aluminum Alkyls, Ltd.) was further added thereto. The reaction solution in the flask was cooled to 10° C. and was stirred at the tip peripheral speed of 0.97 m/sec (stirring rotation speed of 350 rpm).

Then, the total amount of the mixed solution of 6.5 g (72 mmol) of 1,4-butanediol and 29.0 g (629 mmol) of ethanol was added into the flask at the addition rate of 0.5 g/min using a dropping funnel. After the addition was completed, the temperature of the inside of the flask was elevated up to 30° C. and diethyl zinc was reacted with 1,4-butanediol and ethanol for 1 hour. And after the temperature was elevated up to 50° C., the reaction was further carried out for 1 hour.

Thereafter, the temperature of the inside of the flask was elevated up to 140° C. and the unreacted alcohol was distilled off from the system along with n-hexane. After being cooled, the reaction solution in the flask was diluted with 400 ml of n-hexane to obtain 302 g of a dispersion containing 3% by mass of an organozinc catalyst (catalyst A). The measurement results of the average particle diameter of the obtained catalyst A are shown in Table 1.

Preparation Example 2

Catalyst B

An operation was carried out in the same manner as Preparation Example 1 except that the tip peripheral speed was changed from 0.97 m/sec (stirring rotation speed of 350 rpm) to 0.55 m/sec (stirring rotation speed of 200 rpm), thereby obtaining 302 g of a dispersion containing 3% by mass of an organozinc catalyst (catalyst B). The measurement results of the average particle diameter of the obtained catalyst B are shown in Table 1.

Preparation Example 3

Catalyst C

An operation was carried out in the same manner as Preparation Example 1 except that the tip peripheral speed was changed from 0.97 m/sec (stirring rotation speed of 350 rpm) to 1.94 m/sec (stirring rotation speed of 700 rpm), thereby obtaining 302 g of a dispersion containing 3% by mass of an organozinc catalyst (catalyst C). The measurement results of the average particle diameter of the obtained catalyst C are shown in Table 1.

Preparation Example 4

Catalyst D

An operation was carried out in the same manner as Preparation Example 2 except that the used amount of 1,4-butanediol was changed from 6.5 g (72 mmol) to 2.2 g (24 mmol), thereby obtaining 302 g of a dispersion containing 3% by mass of an organozinc catalyst (catalyst D). The measurement results of the average particle diameter of the obtained catalyst D are shown in Table 1.

Preparation Example 5

Catalyst E

An operation was carried out in the same manner as Preparation Example 1 except that the used amount of ethanol was changed from 29.0 g (629 mmol) to 17.6 g (382 mmol), thereby obtaining 302 g of a dispersion containing 3% by mass of an organozinc catalyst (catalyst E). The measurement results of the average particle diameter of the obtained catalyst E are shown in Table 1.

TABLE 1

| | | Condition of catalyst preparation | | | | Average particle diameter [μm] |
|---|---|---|---|---|---|---|
| | | Tip peripheral speed [m/sec] | Alcohol ratio | Addition rate [g/min] | Temperature in system [° C.] | |
| Preparation Example 1 | Catalyst A | 0.97 | 8.7 | 0.5 | 10 | 35 |
| Preparation Example 2 | Catalyst B | 0.55 | 8.7 | 0.5 | 10 | 45 |

TABLE 1-continued

|  |  | Condition of catalyst preparation | | | | Average particle diameter [μm] |
|---|---|---|---|---|---|---|
|  |  | Tip peripheral speed [m/sec] | Alcohol ratio | Addition rate [g/min] | Temperature in system [° C.] |  |
| Preparation Example 3 | Catalyst C | 1.94 | 8.7 | 0.5 | 10 | 30 |
| Preparation Example 4 | Catalyst D | 0.55 | 26.2 | 0.5 | 10 | 53 |
| Preparation Example 5 | Catalyst E | 0.97 | 5.3 | 0.5 | 10 | 25 |

In Table 1, alcohol ratio represents a molar ratio of a monohydric alcohol (ethanol) with respect to an aliphatic polyhydric alcohol (1,4-butanediol). The addition rate represents an addition (supply) rate into the inside of the system (into flask) of the mixed solution of an aliphatic polyhydric alcohol and a monohydric alcohol. The temperature in system represents a temperature of the inside of the system (reaction solution) when the mixed solution of an aliphatic polyhydric alcohol and a monohydric alcohol is supplied into the system.

Example 1

A pressure resistant reaction vessel of an inner diameter of 94 mm and a volume of 1 L which is provided with a dropping funnel, a nitrogen gas inlet tube and an impeller having an anchor type paddle blade of a blade diameter of 47 mm was prepared.

After replacing the inside of the pressure-resistant reaction vessel with a nitrogen gas, 345 g of n-hexane (manufactured by Sumitomo Chemical Co., Ltd., high purity for industrial use) as a polymerization solvent was added into the reaction vessel and 3.1 g of a dispersion of catalyst A obtained in Preparation Example 1 was added thereto under stirring to disperse uniformly, thereby obtaining a polymerization solution.

Next, 81 g (1.84 mol) of ethylene oxide was added to the polymerization solution. Thereafter, the temperature of the polymerization solution was elevated up to 30° C. and the polymerization of ethylene oxide was carried out for 6 hours.

After the polymerization reaction was completed, the product was separated from n-hexane by filtration and 80.5 g of polyethylene oxide particles was obtained by drying under reduced pressure at 40° C. for 5 hours. The yield of the obtained polyethylene oxide particles was 99.3% by mass with respect to ethylene oxide. The evaluation of the mass average particle diameter and the dispersibility in water of the obtained polyethylene oxide particles was carried out. The evaluation results are described in Tables 2 and 3.

Example 2

80.7 g of polyethylene oxide particles was obtained in the same manner as Example 1 except that the dispersion of the catalyst A was changed to the dispersion of the catalyst B. The yield of the obtained polyethylene oxide particles was 99.6% by mass with respect to ethylene oxide. The evaluation of the mass average particle diameter and the dispersibility in water of the obtained polyethylene oxide particles was carried out. The evaluation results are described in Tables 2 and 3.

Example 3

80.3 g of polyethylene oxide particles was obtained in the same manner as Example 1 except that the dispersion of the catalyst A was changed to the dispersion of the catalyst C. The yield of the obtained polyethylene oxide particles was 99.1% by mass with respect to ethylene oxide. The evaluation of the mass average particle diameter and the dispersibility in water of the obtained polyethylene oxide particles was carried out. The evaluation results are described in Tables 2 and 3.

Example 4

80.3 g of polyethylene oxide particles was obtained in the same manner as Example 1 except that the dispersion of the catalyst A was changed to the dispersion of the catalyst D. The yield of the obtained polyethylene oxide particles was 99.1% by mass with respect to ethylene oxide. The evaluation of the mass average particle diameter and the dispersibility in water of the obtained polyethylene oxide particles was carried out. The evaluation results are described in Tables 2 and 3.

Comparative Example 1

80.4 g of polyethylene oxide particles was obtained in the same manner as Example 1 except that the dispersion of the catalyst A was changed to the dispersion of the catalyst E. The yield of the obtained polyethylene oxide particles was 99.3% by mass with respect to ethylene oxide. The evaluation of the mass average particle diameter and the dispersibility in water of the obtained polyethylene oxide particles was carried out. The evaluation results are described in Tables 2 and 3.

TABLE 2

|  | Catalyst type | Mass percentage of particles on each sieve [% by mass] (particle size distribution) | | | | | | | | Mass average particle diameter [μm] |
|---|---|---|---|---|---|---|---|---|---|---|
|  |  | Opening size 500 μm | Opening size 300 μm | Opening size 250 μm | Opening size 180 μm | Opening size 150 μm | Opening size 106 μm | Opening size 75 μm | Saucer |  |
| Example 1 | Catalyst A | 7.1 | 37.9 | 29.0 | 24.8 | 0.5 | 0.5 | 0.1 | 0.1 | 291 |
| Example 2 | Catalyst B | 24.0 | 40.4 | 9.2 | 17.1 | 4.6 | 2.1 | 0.4 | 2.2 | 357 |
| Example 3 | Catalyst C | 8.6 | 2.9 | 23.2 | 60.5 | 3.4 | 1.1 | 0.2 | 0.1 | 235 |
| Example 4 | Catalyst D | 12.1 | 76.8 | 3.6 | 3.3 | 1.1 | 2.0 | 0.8 | 0.3 | 389 |

TABLE 2-continued

| | Catalyst type | Mass percentage of particles on each sieve [% by mass] (particle size distribution) | | | | | | | Mass average particle diameter [μm] |
| --- | --- | --- | --- | --- | --- | --- | --- | --- | --- |
| | | Opening size 500 μm | Opening size 300 μm | Opening size 250 μm | Opening size 180 μm | Opening size 150 μm | Opening size 106 μm | Opening size 75 μm | Saucer | |
| Comparative Example 1 | Catalyst E | 6.0 | 2.4 | 4.7 | 38.9 | 5.9 | 12.1 | 13.2 | 16.8 | 183 |

TABLE 3

| | Catalyst type | Dispersibility in water |
| --- | --- | --- |
| Example 1 | Catalyst A | A |
| Example 2 | Catalyst B | A |
| Example 3 | Catalyst C | A |
| Example 4 | Catalyst D | A |
| Comparative Example 1 | Catalyst E | D |

From Table 2, it was found that the proportion of small particles is small and the mass average particle diameter is reasonably large with respect to polyalkylene oxide particles obtained in Examples. Furthermore, from Table 3, it was found that polyalkylene oxide particles obtained in Examples have an excellent dispersibility in water.

The invention claimed is:

1. A production method of polyalkylene oxide particles, comprising:

forming polyalkylene oxide particles by polymerization of an alkylene oxide in a polymerization solution containing a polymerization solvent and a catalyst dispersed in the polymerization solvent, wherein the catalyst is an organozinc catalyst in a form of particles having an average particle diameter more than 25 μm.

2. The production method according to claim 1, wherein the organozinc catalyst is a particulate reaction product obtainable by a method including: reacting an organozinc compound with an aliphatic polyhydric alcohol and a monohydric alcohol, thereby forming a particulate reaction product.

3. The production method according to claim 1, wherein the polymerization solution contains 0.00005 mol or more of the catalyst with respect to 1 mol of the alkylene oxide.

4. Polyalkylene oxide particles obtainable by the production method according to claim 1, wherein the proportion of particles having a particle diameter less than 150 μm is 0.7% or more and less than 30% by mass.

* * * * *